United States Patent Office 2,716,651
Patented Aug. 30, 1955

2,716,651

3 - (4 - CHLORO - 7 - HYDROXY - 3 - METHYL-PHTHALIDE - 3 - (5,6,8 - TRIHYDROXY - α-TETRALONE AND METHOD OF PREPARING THE SAME

Coy W. Waller, Nanuet, and Carl F. Wolf, Spring Valley, N. Y., assignors to American Cyanamid Company, New York, N. Y., a corporation of Maine No Drawing. Application October 11, 1952, Serial No. 314,407

3 Claims. (Cl. 260—343.3)

This invention relates to a new phthalide compound and methods of preparing the same.

The new compound of this invention is 3-(4-chloro-7-hydroxy-3-methylphthalide-3-(5,6,8-trihydroxy-α-tetralone and may be best represented by the following structural formula:

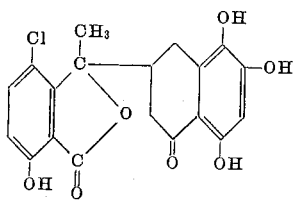

The new compound is of interest in several fields of organic chemistry. For instance, it has been found to possess bactericidal properties and is effective against a large number of Gram-negative and Gram-positive bacteria. It can, therefore, be employed in preparations prepared for use as bactericides. Other uses for the new compound will undoubtedly be apparent to those skilled in the art.

While it is not intended that this invention be limited to this compound when prepared by any one particular procedure, a method of preparing this new compound has been discovered and it is intended that this new method also constitute a part of the present invention. According to the new method of this invention, 3-(4-chloro-7-hydroxy-3-methylphthalide-3)-5,6,8-trihydroxy-7-carboxamide-α-tetralone is hydrolyzed by heating the same with a basic hydroxide at a temperature of from about 125° C.–250° C. This new reaction can be illustrated by the following equation:

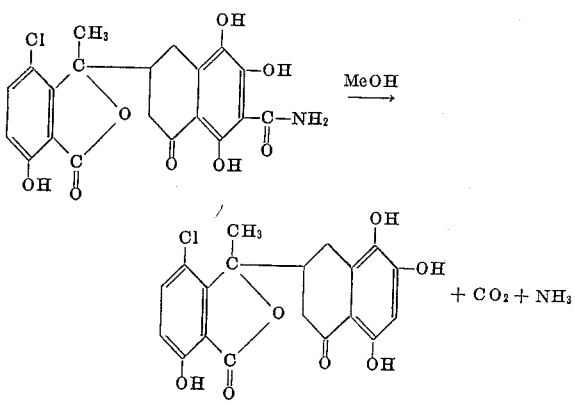

in which Me represents metal.

As will be seen from the above equation, the hydrolysis results not only in the liberation of ammonia, but cleaves the amide to also give carbon dioxide. In fact, it will usually be found that this carbon dioxide is liberated from the reaction mixture, due to the relatively high temperature, even in the presence of the necessary metal hydroxide.

The reaction is preferably performed in a high boiling inert solvent, although, if desired, one may use a lower boiling solvent under pressure. The preferred inert solvents are the glycols and glycol ethers, as may be illustrated by ethylene glycol and 2-ethoxyethanol. These solvents not only provide a conveniently high boiling point, but also provide a relatively good solubility for the metal hydroxide as well as for the metal salts of the novel compound and the amide. Suitable metal hydroxides include the hydroxides of the alkali metals and alkaline earth metals as illustrated by sodium hydroxide and potassium hydroxide.

The reaction can be conducted at any convenient temperature between about 125° C. and 250° C. with the preferred range being from about 135° C.–200° C. At temperatures below about 135° C. the reaction velocity decreases to the point where a prolonged reaction period is necessary for a reasonably complete reaction and at a temperature above about 200° C., some decomposition is experienced. At about 130° C. the reaction is reasonably complete in about eighteeen hours, and at about 190° C., the reaction is reasonably complete in about one hour. To avoid undue decomposition it is usually advantageous to conduct the reaction in an inert atmosphere, for instance in an atmosphere of purified nitrogen.

The 3 - (4 - chloro - 7 - hydroxy - 3 - methylphthalide-3) - 5,6,8 - trihydroxy - 7 - carboxamide - α - tetralone employed as a starting material for the preparation of the new compound of this invention can be obtained from chlortetracycline by treatment with a strong base followed by treatment with a strong acid. Such a procedure is illustrated in detail in the examples to follow.

The following examples are given for the purpose of illustration:

*Example I*

To a suspension of 80 gm. of chlortetracycline and 80 gm. of sodium sulfite in 800 ml. of water there was added 800 ml. of 10 N NaOH in small portions with shaking. An exothermic reaction occurred yielding a black solution. This dark solution was left in a tightly stoppered flask for four days at room temperature, after which time it was poured into a solution of 800 ml. of conc. HCl and 200 ml. of water. A gummy product separated and was mechanically removed. After air drying, 65 gms. of this material was dissolved in 250 ml. of conc. $H_2SO_4$ and heated on a steam-bath for fifteen to twenty minutes until complete solution occurred. The resulting thick, black solution was poured onto 500 gm. of ice. This mixture was then heated to boiling and the dilute $H_2SO_4$-insoluble material was removed by filtration, washed thoroughly with water and left to air dry. This crude material was dissolved in 1500 ml. of hot methyl cellosolve and the solution was treated with decolorizing charcoal and filtered. A small amount of conc. $H_2SO_4$ was added to the filtrate, the solution heated and then diluted with an equal volume of hot water. On standing, light yellow needles of 3-(4-chloro-7-hydroxy-3-methylphthalide - 3) - 5,6,8 - trihydroxy - 7 - carboxamide - α-tetralone were deposited. The product was separated by filtration, washed with water and dried.

In a 1 N solution of potassium hydroxide in ethylene glycol there was dissolved 40 gm. of the above product and the resulting mixture refluxed under purified nitrogen for one hour. The mixture was then cooled to 100° C. and to the cooled solution there was added an excess (120 ml.) of 6 N hydrochloric acid followed by two volumes of hot water. On standing, yellow crystals of the crude new phthalide compound were obtained. The crude material was purified by recrystallization from methanol-water, ethyl acetate-petroleum ether and then from ethyl acetate alone to give a purified material having a melting point of about 296° C.–300° C. with decomposition.

*Example II*

Example I was repeated except that in the place of the glycol solvent, an equal quantity of Cellosolve was employed and the refluxing was conducted for eighteen hours. The yield of the phthalide compound was substantially the same as in Example I.

We claim:

1. The new compound 3-(4-chloro-7-hydroxy-3-methylphthalide - 3 ) - 5,6,8 - trihydroxy - α - tetralone.

2. The method of preparing 3-(4-chloro-7-hydroxy-3-methylphthalide - 3 ) - 5,6,8 - trihydroxy - α - tetralone which comprises heating 3-(4-chloro-7-hydroxy-3-methylphthalide - 3 ) - 5,6,8 - trihydroxy - 7 - carboxamide - α - tetralone in the presence of a basic metal hydroxide and in an inert solvent at a temperature of from about 125° C.–250° C.

3. The method of claim 2 wherein the basic metal hydroxide is potassium hydroxide and the reaction is conducted at a temperature of from about 135° C.–200° C.

References Cited in the file of this patent

Dornbush: Proc. Soc. Exptl. Biol. and Med., vol. 76, p. 676, (April 1951).
Hochstein: JACS 73, p. 5008 (October 1951).
Pasternack: JACS 74, p. 1926 (1952).
Stephens: JACS 74, p. 4976 (1952).